Figure 1:
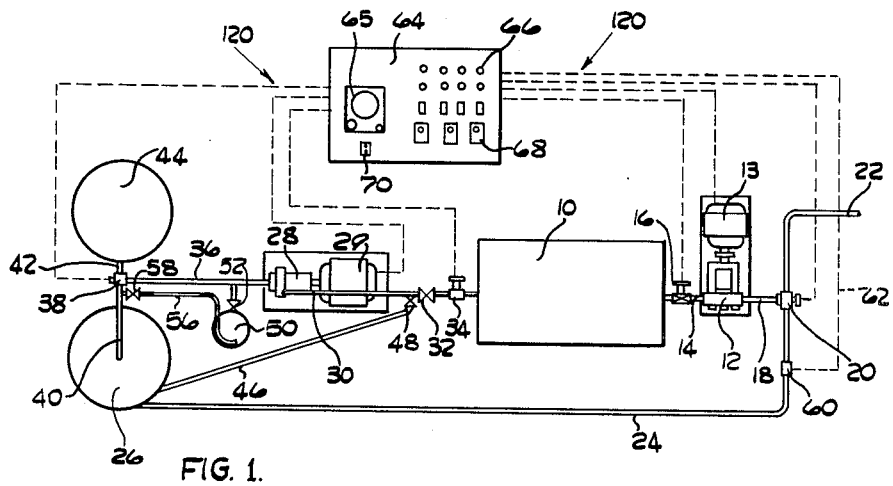

Jan. 5, 1965 A. J. ROSSI 3,164,002
APPARATUS FOR TREATING HIDES
Filed July 30, 1962 4 Sheets-Sheet 1

INVENTOR,
Angelo Joseph Rossi
BY Wenderoth, Lind
and Ponack, Attorneys

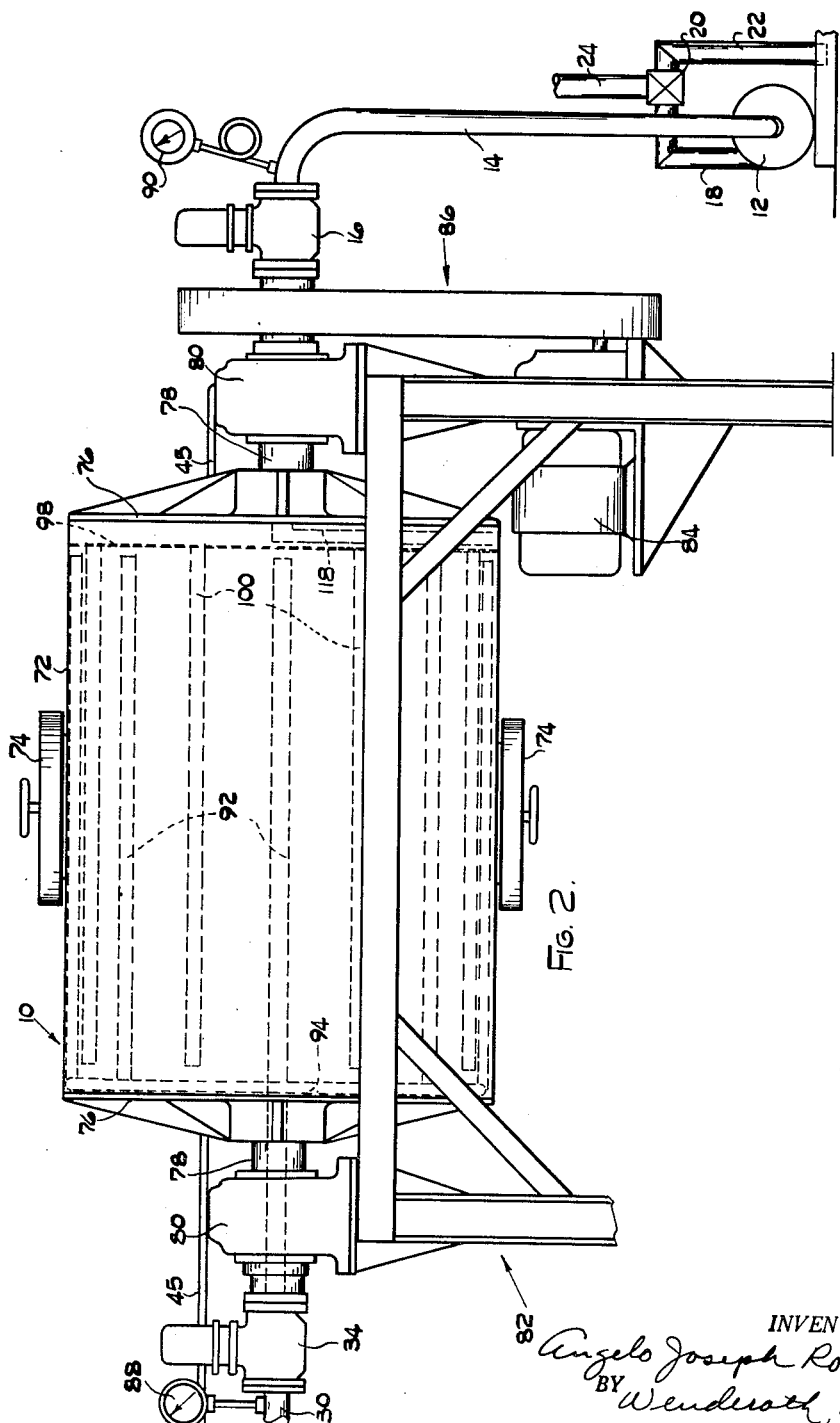

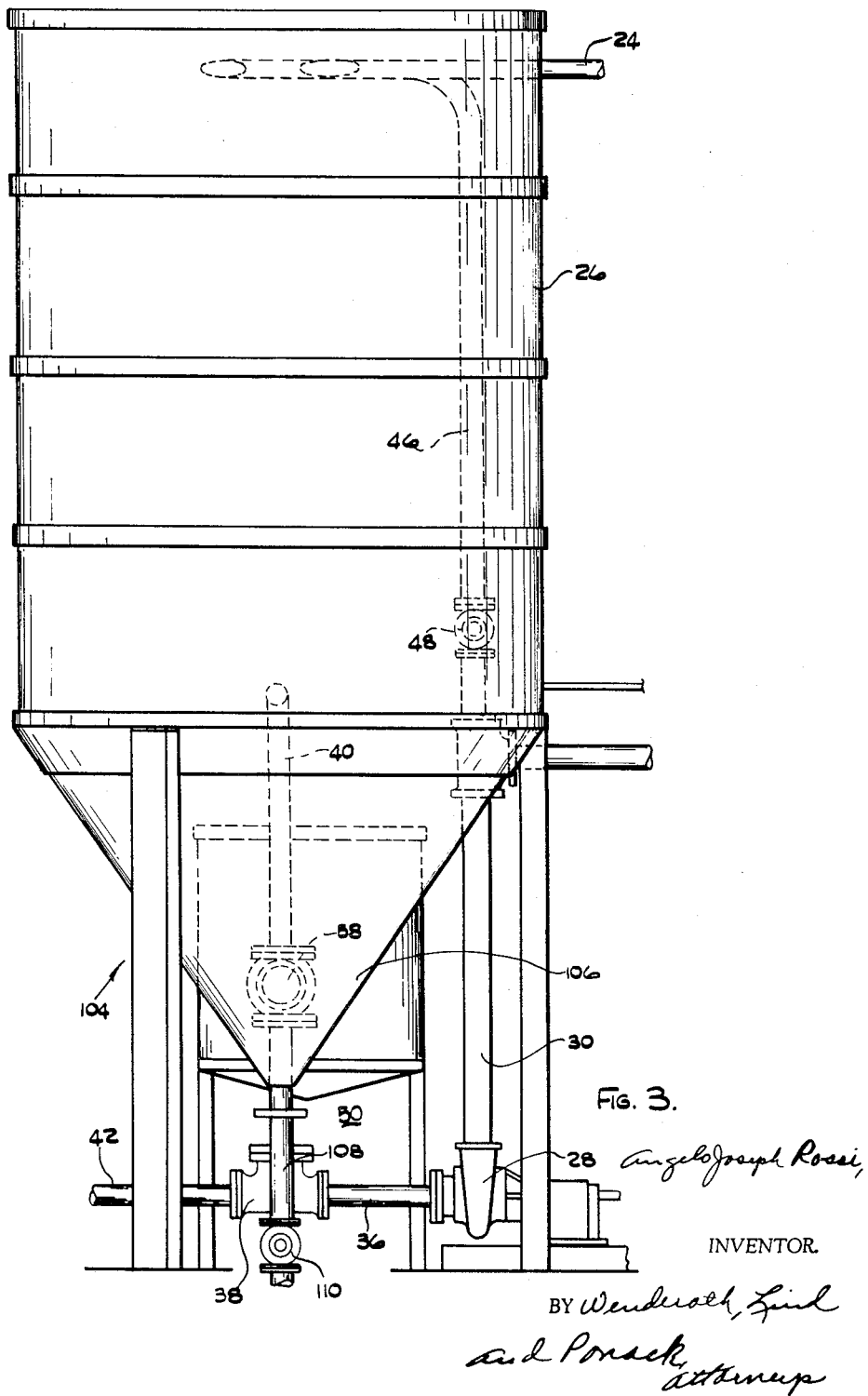

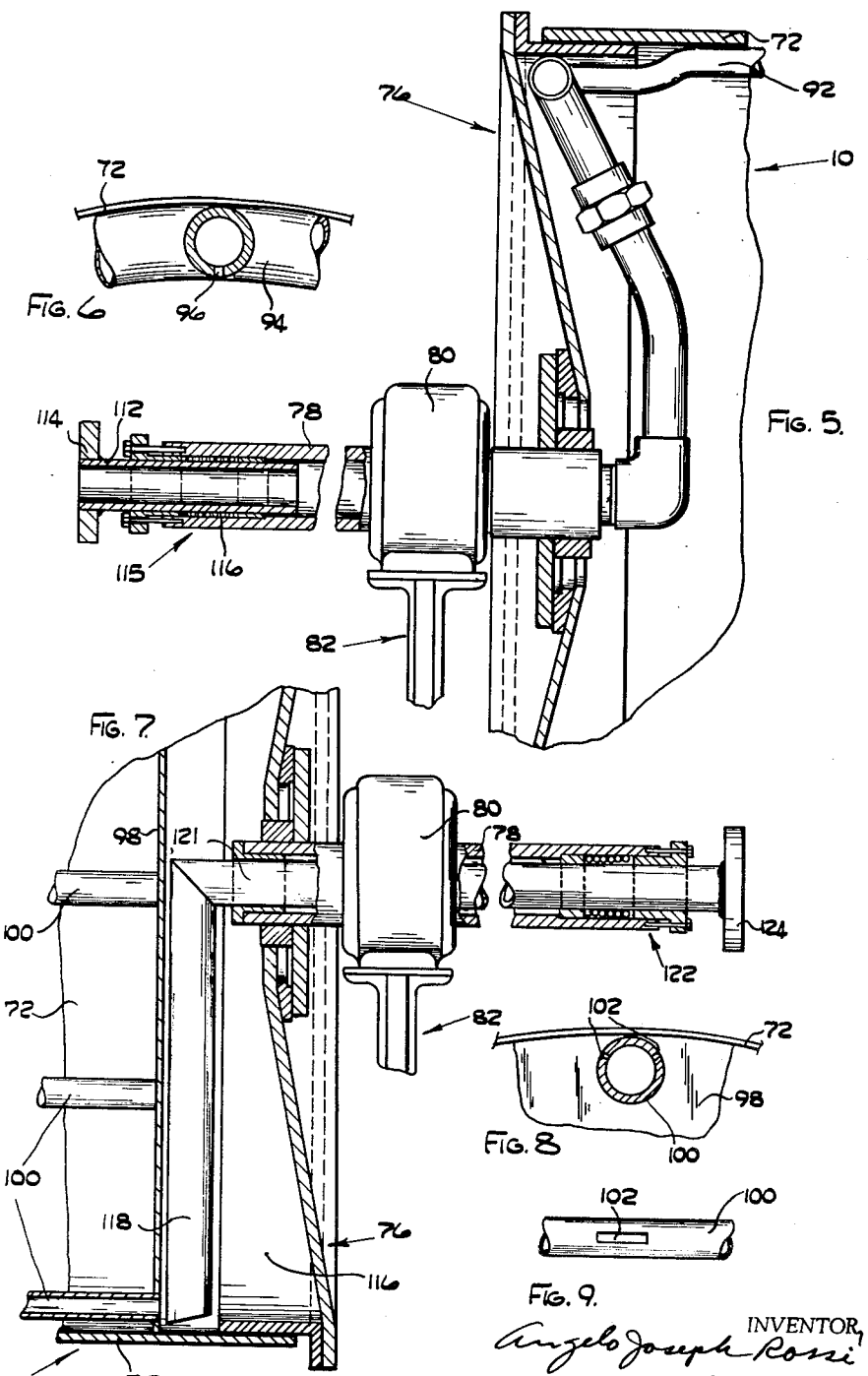

United States Patent Office 3,164,002
Patented Jan. 5, 1965

3,164,002
APPARATUS FOR TREATING HIDES
Angelo Joseph Rossi, Mount Road Township, Port Elizabeth, Republic of South Africa, assignor to Osmocure (Proprietary) Limited, Mount Road Township, Port Elizabeth, Republic of South Africa
Filed July 30, 1962, Ser. No. 213,394
2 Claims. (Cl. 69—30)

This invention relates to apparatus for treating hides after animals have been slaughtered and prior to the treatment of the hides in curing sheds.

In conventional practice hides are liable to deteriorate in the period after slaughter of the animals until the hides are delivered to the curing sheds for curing. It is an object of this invention to provide apparatus for pre-treating hides during this period to provide better quality cured hides than is obtained by methods presently in use.

According to the invention apparatus for treating hides of slaughtered animals prior to delivery to the curing sheds, includes:
  (a) a pressure-tight vessel in the form of a round cylindrical shell and end walls, and adapted to receive hides and wash liquor, and mounted to rotate about a horizontal axis, and having
    (i) a closable charging opening
    (ii) coaxial hollow journals fast with the end walls, a journal being provided at each end, and
    (iii) a gland in each of the hollow journals,
  (b) drive means to rotate the vessel
  (c) evacuating means to evacuate wash liquor from the vessel and to reduce the pressure inside the vessel to a value below atmospheric pressure and including:
    (i) a series of suction pipes spaced circumferentially around the inner surface of the shell, the suction pipes having outwardly directed suction openings,
    (ii) a suction header inside the vessel and connected to the series of suction pipes, and
    (iii) a suction pump and suction connections connecting the suction pump to the suction header, the suction connections comprising a pipe passing into the suction header through the hollow journal and through one of the glands which is adapted to permit rotation of the suction header relative to the suction pump,
  (d) curing fluid charging means which includes:
    (i) a series of pressure pipes spaced circumferentially around the inner surface of the shell, the pressure pipes having inwardly directed spray outlet openings
    (ii) a pressure header inside the vessel and connected to the series of pressure pipes, and
    (iii) a curing fluid pump and pressure connections connecting the pump to the pressure header, the pressure connections comprising a pressure pipe passing through the gland in the other hollow journal, this gland being adapted to permit rotation of the pressure header relative to the pump;
  whereby, by rotating the vessel and under the action of centrifugal force, wash liquor may be extracted from hides contained in the vessel, the wash liquor passing into the outwardly directed suction openings of the suction pipes, and whereby curing fluid may be ejected in spray form from out of the spray outlet openings to impinge on the hides within the vessel.

The apparatus may include one or more of the following features.

The apparatus may include also curing fluid charging means to charge the vessel under pressure with curing fluid.

The hides are subjected to a drying action by centrifugal force when the vessel rotates. Centrifugal force and a vacuum may both be applied to the hides, which after having been subjected to the drying action may be soaked in a curing fluid, say brine. If desired the soaking may take place under pressure. This treatment is done on the hides preferably soon after slaughtering of the animals but if there has been some delay since slaughtering, and if blood has coagulated on the hides, then the treatment may include the steps of washing the hides with a wash liquor having anti-coagulant or blood solvent properties or both. The wash liquor may be rendered to have these properties by dissolving in it alum or naphthalene. The curing fluid may include antiseptics, say one or more of the quaternary ammonium compounds, or zinc chloride, zinc oxide, or chloride of lime, or any combination thereof. The quantity of zinc chloride or zinc oxide used may fall within the range of one part in a hundred to one part in a thousand by weight. The curing fluid, after soaking may be cleansed and regenerated for further use in soaking.

Further features of the apparatus will become apparent from the following description of specific apparatus with reference to the accompanying drawings, and from the description relating to the operation of the apparatus.

Figure 4:
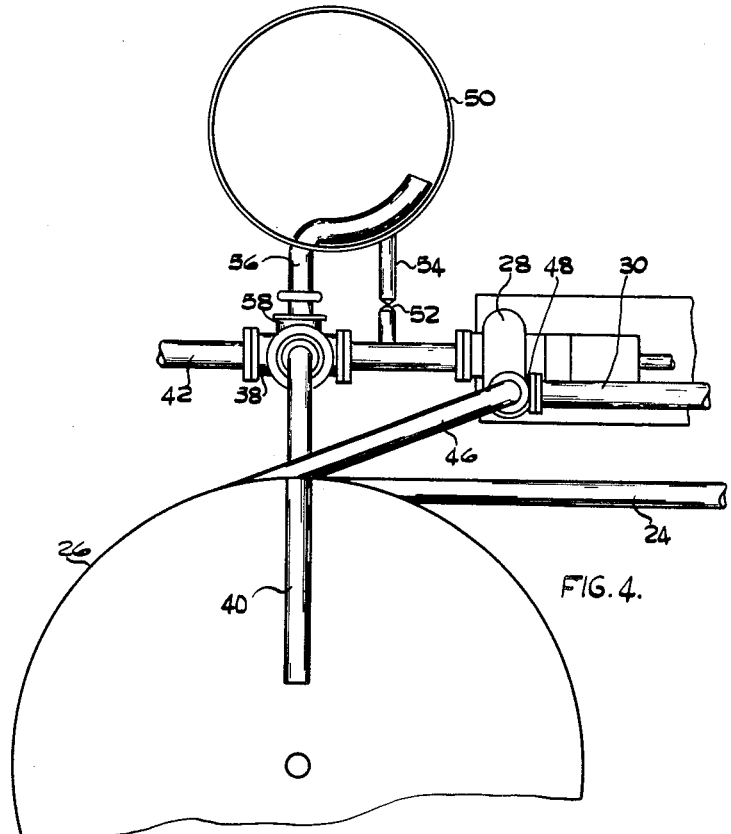

In the drawings
FIGURE 1 shows a schematic layout of apparatus for automatic operation;
FIGURE 2 shows a side elevation of a pressure vessel mounted to rotate about a horizontal axis;
FIGURE 3 shows a side elevation of a curing fluid-cum-flocculating tank, and other connections;
FIGURE 4 shows a part plan view corresponding to FIGURE 3;
FIGURE 5 shows a detail sectional part side elevation of a pressure universal joint and pressure connections;
FIGURE 6 shows a detail in part of a pressure pipe and pressure header;
FIGURE 7 shows a detail sectional part side elevation of a suction joint and suction pipe and header;
FIGURE 8 shows a detail in part of a suction pipe and header;
FIGURE 9 shows a detail of the suction openings in a suction pipe.

Referring to FIGURE 1 of the drawings, reference numeral 10 refers to a pressure-tight vessel adapted to receive hides and wash liquor, and mounted to rotate about a horizontal axis. There is provided further a suction pump 12 drivingly connected to electric motor 13 and having a suction pipe 14 connected to the vessel via a vacuum valve 16, whereby the pressure inside the vessel may be reduced to a value below atmospheric pressure. The delivery pipe 18 of the suction pump 12 is connected via a two-way valve 20 to a drain outlet 22 and to a return connection 24 leading to a curing fluid-cum-flocculating tank 26, and which will be more fully described hereafter. There is further provided a curing fluid pressure pump 28 drivingly connected to electric motor 29 and having a delivery pipe 30 connected via stop valve 32 and via automatic pressure valve 34 to the pressure-tight vessel 10, and whereby curing fluid or wash liquor may be charged under pressure into the pressure-tight vessel 10.

The suction line 36 of the curing fluid pressure pump 28 is connected via a three-way valve 38 and via curing fluid suction pipe 40 to a curing fluid-cum-flocculating tank 26. The suction line 36 is also connected via three-way valve 38 and via water or wash liquor suction pipe 42 to water or wash liquor tank 44. Trickle feed pipe 45 feeds water to the gland(s) of the suction pump 12 and to the glands 115 and 122 described more fully hereafter. There is further provided a saturated curing fluid return pipe 46 comprising stop valve 48 and connecting delivery pipe 30 with tank 26. Saturator tank 50 is connected via stop valve 52 and pipe 54 to suction pipe 36, and via pipe 56 and stop valve 58 to curing fluid suction pipe 40.

Return connection 24 has included in it a pressure switch 60 connected via leads 62 to control panel 64. On the control panel 64 there is provided a dual control instrument 65 whereby the operating pressure of automatic pressure valve 34 may be set, and whereby the operating vacuum of vacuum valve 16 may be set. The control panel 64, further has timing means (not shown) whereby the sequence and duration of the various parts of the apparatus for automatic operation may be set. On the control panel, there are provided indicator lights 66 to indicate the status of the various parts of the apparatus, namely whether they are operated or non-operated. Manually operable switches 68 are provided for setting the parts of the apparatus in operation manually. Manual reset switch 70 is provided whereby the apparatus may be set into operation for a new cycle of automatic working. The description of a cycle of automatic working will be described more fully hereafter.

Referring to FIGURES 2, 5, 6, 7, 8, and 9 of the drawings, there is shown the pressure-tight vessel 10 having a shell 72 in which there are provided manholes, covered by manhole covers 74. The vessel has end walls 76 having hollow journals 78 mounted for rotation in pedestal bearings 80 supported upon frame structure 82. The pressure vessel is arranged to be driven for rotation by electric motor 84 via drive means 86. There is provided a pressure gauge 88, connected to delivery pipe 30 and a vacuum gauge 90 connected to suction pump suction pipe 14.

Along the inside of the shell, spaced circumferentially, there are provided a plurality of pressure pipes 92 connected to pressure header 94 and having a plurality of inwardly directed spray outlet openings 96 (see FIGURE 6). At one end of the vessel there is provided a suction header having a suction header plate 98 to which are connected suction pipes 100 spaced circumferentially along the inside of shell 72, and having outwardly directed suction openings 102 (see FIGURES 8 and 9). The pressure and suction connections will be more fully described hereafter.

The pressure and suction connections will now be more fully described with reference to FIGURES 5, 6, 7, 8, and 9 of the drawings. Referring to FIGURE 5, there is shown a hollow journal 78, a pressure inlet pipe 112 having flange 114. At the end of the hollow journal 78 there is provided a gland 115 within which packing 116 is receivable. In operation, hollow journal 78 is adapted to rotate sealingly around pressure inlet pipe 112, while wash liquor or curing fluid under pressure is delivered along pressure inlet pipe 112 into the vessel 10.

Referring to FIGURES 7, 8 and 9 of the drawings, there is shown suction header plate 98 to which are connected suction pipes 100 to communicate with suction header cavity 116 within which is disposed depending suction pipe 118 which is connected to suction pipe 120 coaxial with hollow journal 78 and passing through gland 122 at the end of hollow journal 78 and having suction flange 124 to which is connected suction pump 12 via suction connections not shown. The pressure vessel is adapted to rotate in bearings 80 while the depending suction pipe 118 and suction pipe 121 remain stationary.

Referring to FIGURE 3 of the drawings there is shown in side elevation curing fluid-cum-flocculating tank 26 supported on support structure 104, and having a downwardly converging conical floor 106 having a drain outlet pipe 108 to which is connected stop valve 110.

The operational sequence of the apparatus for automatic operation will now be described. At the start of a cycle of operations, after the vessel (10) has been loaded with skins, three-way valve 38 will be in a position to connect the water or wash liquor tank 44 to the suction pipe 36 of the curing fluid pressure pump 28. Upon the manual reset 70 being operated, curing fluid pressure pump 28 comes into operation, whereupon automatic pressure valve 34 opens to deliver wash liquor under pressure into the pressure vessel 10. The pressure vessel is driven to rotate at a speed of about 15 r.p.m. During this stage of the operations, the suction pump 12 is not in operation and hence vacuum valve 16 is closed. The two-way valve 20 is in position to drain.

After a predetermined period, determined by the timing means or by the number of revolutions performed by the pressure-tight vessel 10, the power supply to electric motor 29 driving curing fluid pressure pump 28 is cut off thus causing it to stop, whereupon automatic pressure valve 34 closes. The timing means also operates to energise electric motor 13 to set in operation suction pump 12 whereupon vacuum valve 16 opens at the required vacuum and the wash liquor is delivered via delivery pipe 18 to drain outlet 22.

After a further predetermined period, determined by the timing means, or by a predetermined number of revolutions of the pressure vessel, the timing means again operates, this time to de-energise the motor 13 so causing the suction pump 12 to stop and thus causing the vacuum valve 16 to close. Thereupon the timing means causes the three-way valve 38 to connect the suction pipe 36 of curing fluid pump 28 to curing fluid tank 26, sets curing fluid pump 28 in operation whereupon automatic pressure valve 34 opens to admit curing fluid under pressure into the pressure vessel 10. The pressure at which the automatic pressure valve 34 operates to open, and the vacuum at which the vacuum valve 16 operates to open, are both set at the pressure vacuum dual control instrument 65, and may be about one atmosphere (gauge) pressure, and one third atmosphere vacuum respectively. The pressure valve 34 ensures that wash liquor or curing fluid is not permitted to enter the vessel 10 unless it is under a predetermined minimum pressure. Similarly, the vacuum valve is arranged to open to permit the passage of fluid from the vessel only when the vacuum reaches a predetermined minimum value, and to remain closed unless that minimum value has been reached.

After a predetermined period, again determined by the timing mechanism, the timing mechanism stops curing fluid pressure pump 28 thus causing automatic pressure valve 34 to close. The timing means also sets suction pump 12 in operation, thus causing vacuum valve 16 to open. The timing means also operates to position two-way valve 20 to connect suction pump delivery pipe 18 to return connection 24 whereby the suction pump extracts curing fluid from the pressure-tight vessel 10 and delivers it into curing fluid-cum-flocculating tank 26. As soon as the curing fluid has been delivered from the pressure-tight vessel 10 into the curing fluid-cum-flocculating tank 26, pressure switch 60 operates and stops the plant and sets the various parts of the apparatus in position for a further cycle of operations. In particular, three-way valve 38 is set in position to connect wash liquor tank 44 with suction pipe 36 of curing fluid pressure pump 28, and positions two-way valve 20 to connect suction pump delivery pipe 18 to drain outlet 22. The pressure-tight vessel 10 is then unloaded and is reloaded with further hides. Thereupon the apparatus is set on its new cycle of operations by operating the manual reset 70.

The gauge pressure (say about one atmosphere) at which pressure switch 60 operates, can be set at the control panel via lead 62. The status of this switch, whether operated or not operated, is also indicated by one of the indicator lights 66. So also is the status of each of the other parts of the apparatus, namely electric motor 13, vacuum valve 16, automatic pressure valve 34, electric motor 29, valve 20, and three-way valve 38 indicated via leads 120, by the indicator lights 66. The dotted lines 120 connecting the control panel 64 with the various parts of the apparatus, are intended to indicate also the power leads connecting two-way valve 20, three-way valve 38, electric motors 13 and 29 with the timing means, and vacuum valve 16 and automatic pressure valve 34 with a power supply.

After a number of cycles, the potency of the curing fluid may have become depleted and it may require regeneration. This is then achieved by charging saturator tank 50 with the necessary regeneration material comprising one or more of the following ingredients—common salt, quaternary ammonium compounds, zinc chloride, zinc oxide, and chloride of lime. Stop valves 58 and 52 are then opened, three-way valve 38 is positioned to close off suction pipe 42, and the curing fluid pressure pump is then set in operation, stop valve 48 is opened and curing fluid is circulated via curing fluid suction pipe 40, stop valve 58, pipe 56, stop valve 52 and pipe 54 and via suction pipe 36, saturator tank 50 and, through curing fluid pressure pump 28, through delivery pipe 30, and via stop valve 48 and via saturated curing fluid return pipe 46 and to the curing fluid tank 26. When the curing fluid has reached the required concentration, stop valves 58, 52, and 48, are again closed, and the plant is ready for a further cycle of operations.

The curing fluid pumped back into the curing fluid-cum-flocculating tank 26 via return connection 24 is permitted to settle out in the tank 26, assisted by a flocculating agent and the sediment is periodically drawn off via drain outlet pipe 108 and stop valve 110. The number of batches of hides, which may be treated before replenishment with water, or regeneration, will depend upon circumstances, upon the number of hides being treated per batch, and upon the amount of curing fluid in circulation. However, the pH value of the curing fluid, should not deviate substantially from about 9. The curing fluid can, of course, be replenished with water, merely by opening the suction 36 of pump 28 to tank 44 and closing off stop valve 32 and opening stop valve 48 to deliver into curing fluid-cum-flocculating tank 26.

After treatment, in the apparatus in accordance with the process, the hides are delivered to the curing shed for further treatment.

By way of further development, in regions where water is scarce, the wash liquor may also be recoverd by flocculation, clarification, and regeneration in a saturator, in somewhat similar fashion to that used for recovering and regenerating the curing fluid.

I claim:
1. Apparatus for treating hides of slaughtered animals prior to delivery to the curing sheds, which includes
    (a) a pressure-tight vessel in the form of a round cylindrical shell and end walls, and adapted to receive hides and wash liquor, and mounted to rotate about a horizontal axis, and having
        (i) a closable charging opening
        (ii) coaxial hollow journals fast with the end walls, a journal being provided at each end, and
        (iii) a gland in each of the hollow journals,
    (b) drive means to rotate the vessel
    (c) evacuating means to evacuate wash liquor from the vessel and to reduce the pressure inside the vessel to a value below atmospheric pressure and including
        (i) a series of suction pipes spaced circumferentially around the inner surface of the shell, the suction pipes having outwardly directed suction openings,
        (ii) a suction header inside the vessel and connected to the series of suction pipes, and
        (iii) a suction pump and suction connections connecting the suction pump to the suction header, the suction connections comprising a pipe passing into the suction header through the hollow journal and through one of the glands wihch is adapted to permit rotation of the suction header relative to the suction pump,
    (d) curing fluid charging means which includes
        (i) a series of pressure pipes spaced circumferentially around the inner surface of the shell, the pressure pipes having inwardly directed spray outlet openings
        (ii) a pressure header inside the vessel and connected to the series of pressure pipes, and
        (iii) a curing fluid pump and pressure connections connecting the pump to the pressure header, the pressure connections comprising a pressure pipe passing through the gland in the other hollow journal, this gland being adapted to permit rotation of the pressure header relative to the pump;
    whereby, by rotating the vessel and under the action of centrifugal force, wash liquor may be extracted from hides contained in the vessel, the wash liquor passing into the outwardly directed suction openings of the suction pipes, and whereby curing fluid may be ejected in spray form from out of the spray outlet openings to impinge on the hides within the vessel.

2. Apparatus according to claim 1 in which the pressure connections include an automatic pressure valve, and in which the suction connections include a vacuum valve; whereby the pressure valve is arranged to open to permit the passage of fluid into the vessel only under a predetermined minimum pressure and to remain closed unless that minimum pressure is reached, and whereby the vacuum valve is arranged to open to permit the passage of fluid from the vessel only when the vacuum reaches a predetermined minimum value, and to remain closed unless that minimum vacuum is reached.

References Cited by the Examiner

UNITED STATES PATENTS

| 207,774 | 9/78 | Puech | 8—139 |
|---|---|---|---|
| 234,659 | 11/80 | Davis | 69—30 |
| 313,542 | 3/85 | Simpson | 69—30 |
| 314,199 | 3/85 | Simpson | 69—30 |
| 637,421 | 11/99 | Schmidt et al. | 69—30 |
| 640,814 | 1/00 | Rogers | 8—139 |
| 1,911,896 | 5/33 | Hertzsch | 69—30 X |
| 2,360,379 | 10/44 | Vetorino | 69—30 |
| 2,370,285 | 2/45 | Beede et al. | 68—208 X |
| 2,397,268 | 3/46 | Jorgenson et al. | 68—208 X |
| 2,532,002 | 11/50 | Wilson | 69—30 |

FOREIGN PATENTS 839,055 6/60 Great Britain.

JORDAN FRANKLIN, *Primary Examiner.*

ABRAHAM H. WINKELSTEIN, DAVID J. WILLIAMOWSKY, *Examiners.*